United States Patent [19]

Inoue et al.

[11] 4,264,565

[45] Apr. 28, 1981

[54] METHOD FOR PRODUCING POWDER OF α-SILICON NITRIDE

[75] Inventors: Hiroshi Inoue, Kawaguchi; Katsutoshi Komeya, Kanagawa; Akihiko Tsuge, Yokohama, all of Japan

[73] Assignee: Tokyo Shibaura Denki Kabushiki Kaisha, Kawasaki, Japan

[21] Appl. No.: 121,095

[22] Filed: Feb. 13, 1980

[30] Foreign Application Priority Data

Feb. 19, 1979 [JP] Japan .................................. 54/17188

[51] Int. Cl.$^3$ .............................................. C01B 21/06
[52] U.S. Cl. .................... 423/344; 423/406; 106/73.5
[58] Field of Search ................ 423/344, 406; 106/73.5

[56] References Cited

U.S. PATENT DOCUMENTS

| 3,855,385 | 12/1974 | Cutler ................................... 423/344 |
| 4,117,095 | 9/1978 | Komeya et al. ..................... 423/344 |

FOREIGN PATENT DOCUMENTS 52-38500  3/1977  Japan .
53-102300  9/1978  Japan .

*Primary Examiner*—Jack Cooper
*Attorney, Agent, or Firm*—Oblon, Fisher, Spivak, McClelland & Maier

[57] ABSTRACT

A method for producing powder of α-silicon nitride which comprises the steps of:

adding 0.3 to 2 parts by weight of powder of carbon and 0.005 to 1 paret by weight of at least one silicon compound selected from the group consisting of $Si_3N_4$, SiC and silicon oxide nitride series compounds to one part by weight (as converted to $SiO_2$) to a liquid silane derivative which produces a precipitate and HCl by hydrolysis and further causes $SiO_2$ to be grown by the baking of said precipitate, or the precipitate produced by hydrolysis of the liquid silane derivatives;

hydrolyzing the resultant mixture, if necessary;

washing the mixture to separate a solid component, if necessary; and baking the solid component for reduction and nitrogenization at a temperature of 1300° to 1500° C. in an atmosphere mainly consisting of a nitrogen gas or a gas of a nitrogen compound.

11 Claims, No Drawings

METHOD FOR PRODUCING POWDER OF α-SILICON NITRIDE

This invention relates to a method for producing powder of α-silicon nitride and more particularly to a method of producing powder of α-silicon nitride of high quality with high yield.

A sintered product of powder mixture containing powder of silicon nitride as a main raw material such as silicon nitride-yttrium oxide ($Si_3N_4$-$Y_2O_3$) or silicon nitride-magnesium oxide ($Si_3N_4$-MgO) has high mechanical strength and heat resistance. Therefore, an attempt is made to apply such sintered product as a material of a structural member of for example, a high temperature gas turbine, a sintered product practically used as a material of a structural member withstanding high temperature and great stress is rigidly demanded to have prominent physical and chemical stability at high temperature. The particularly important thermal and mechanical properties of the sintered product are largely affected by the kind of the powders and the content of impurities therein. The powder of silicon nitride is preferred to contain as much α-$Si_3N_4$ as possible. The following three processes are generally known for the production of powder of $Si_3N_4$.

(1) Nitrogenizing powder of metallic silicon;

$$3Si + 2N_2 \rightarrow Si_3N_4$$

(2) Carrying out a gaseous reaction between silicon tetrachloride or silane and ammonia;

$$3SiCl_4 + 4NH_3 \rightarrow Si_3N_4 + 12HCl$$

(3) Reducing silica powder with carbon in a nitrogen atmosphere $$3SiO_2 + 6C + 2N_2 \rightarrow Si_3N_4 + 6CO$$

With the above mentioned process of (1) in which an exothermal reaction is taken place, it is necessary to control the exothermal reaction, for example, to use relatively coarse powder of silicon and finely crush after nitrogenization. During the step of such fine crushing, impurities are unavoidably carried into the produced powder $Si_3N_4$. Therefore, the product has many problems for application as a material of, for example, a structural member of a high temperature gas turbine, though usable as a heat-resisting and corrosion-resisting material of low quality.

The process of (2) is suitable for production of a material used as a coating on the surface of, for example, a semiconductor element, but meets with a difficulty for the mass production of an inorganic heat-resistant material.

The process of (3) has the drawbacks that it is not only necessary to use fully purified powders of $SiO_2$ and carbon as raw materials, but also the resultant product is a mixture of, for example, α-$Si_3N_4$, β-$Si_3N_4$, silicon oxynitride ($Si_2ON_2$) and SiC, in other words, it is difficult to control a yield of α-$Si_3N_4$. Therefore, the process of (3) has practically problems in raw material and reaction conditions, though having the advantage of causing reaction to proceed by an uncomplicated process.

It is accordingly the object of this invention to provide a method for producing with a high yield powder of α-silicon nitride adapted to be used as a material of a structural member resistant to high temperature and great stress without the necessity of applying a complicated process and reaction apparatus.

The method of this invention for producing powder of α-silicon nitride comprises the steps of:

adding 0.3 to 2 parts by weight of powder of carbon and 0.005 to 1 part by weight of powder of at least one silicon compound seleted from the group consisting of $Si_3N_4$, SiC and silicon oxide nitride series compounds to 1 part by weight (as converted to $SiO_2$) of a liquid silane derivative which produces a precipitate and HCl by hydrolysis and further causes $SiO_2$ to be grown by the baking of said precipitate, or the precipitate produced by hydrolysis of the liquid silane derivatives;

hydrolyzing the resultant mixture, if necessary;

washing the mixture to separate a solid component, if necessary; and baking the solid component for reduction and nitrogenation at a temperature of 1300° to 1500° C. in an atmosphere mainly consisting of a nitrogen gas or a gas of a nitrogen compound.

According to the method of this invention, powders of carbon and silane compound may be added to a precipitate obtained by hydrolyzing a liquid silane derivative, if the powders are highly pure. Where, however, the powders have a low purity, it is necessary to hydrolyze a mixture of a liquid silane derivative and powders of carbon and silicon compound. The following description chiefly referres to the latter case.

Liquid silane derivatives used in the method of this invention which produce a precipitate and HCl by hydrolysis, and cause $SiO_2$ to be produced by the baking of said precipitate include alkylchlorosilane, and preferably methyltrichlorosilane which allows for the easy hydrolysis. In this case, it is possible to replace a part of methyltrichlorosilane by, for example, 20% by weight or less of dimethyldichlorosilane.

The methyltrichlorosilane contained in a mixture of powders of carbon and a silicon compound is hydrolyzed by the following reaction formula:

$$CH_3SiCl_3 + H_2O \rightarrow CH_3SiO_{3/2} + HCl$$

Namely, HCl is produced together with a precipitate of $CH_3SiO_{3/2}$. The resultant mixture of these products and the powders of carbon and the silicon compound is thereafter washed and filtered. The HCl thus produced very effectively eliminates impurities such as Ca, and Fe contained in the powders of carbon and a silicon compound, thereby ensuring the production of α-$Si_3N_4$ of high purity. The $CH_3SiO_{3/2}$ is baked into $SiO_2$, and reduced and nitrogenized into $Si_3N_4$.

In the silicone industry, methyltrichlorosilane is obtained as a by-product with high purity in large quantities. Therefore, application of methyltrichlorosilane makes it possible to produce α-$Si_3N_4$ at low cost.

The liquid silane compound, powder of carbon and powder of a silicon compound acting as a nucleating agent which are all used as the starting materials of the method of this invention are chosen to have the weight ratio (as measured on the basis of the weight of $SiO_2$) of 1 (as converted to $SiO_2$): 0.3 to 2:0.005 to 1 or preferably 1:0.4 to 1:0.01 to 0.1. The reason for this is as follows. Less than 0.3 part by weight of the carbon powder based on 1 part by weight of $SiO_2$ causes part of the $SiO_2$ to remain unreacted, results in the noticeable growth of $Si_2ON_2$, and decreases the production of the desired $\alpha$-Si$_3$N$_4$. Where the carbon powder is added in a larger amount than 2 parts by weight, then $\beta$-Si$_3$N$_4$ is formed to deteriorate the purity of the $\alpha$-Si$_3$N$_4$ and is liable to reduce its yield.

Less than 0.005 part by weight (based on 1 part by weight of SiO$_2$) of powder of a silicon compound results in a decline in the function of acting as a nucleating agent which enables powder of $\alpha$-Si$_3$N$_4$ to be produced in the uniform particle size with high yield. Conversely where the powder of a silicon compound is applied in a larger proportion than 1 part by weight, then said nucleating agent powder displays its property too prominently to produce $\alpha$-Si$_3$N$_4$ having preferred powder characteristics.

For the object of this invention, it is preferred to use the liquid silane compound, powder of carbon and powder of the nucleating agent all having a lower impurity metal than 0.1% by weight. The powder of carbon is preferred to have a particle size of 1 micron or less.

The powder of the nucleating agent is desired to have a particle size of 2 microns or less. Powder of Si$_3$N$_4$ used as a nucleating agent is preferred to be of the $\alpha$-type. However, the Si$_3$N$_4$ may be formed of the $\beta$-type, or if necessary, contain other elements such as aluminium or oxygen in solid solution. The nucleating agent may be formed of Si$_3$N$_4$, SiC, or a silicon oxide nitride series compound alone or a mixture thereof, part of which is substituted by metallic silicon. The nucleating agent should preferably be formed of Si$_3$N$_4$ in particular in order to produce $\alpha$-Si$_3$N$_4$ of high purity.

A solid component derived from the washing and filtration of a hydrolysis, for example, a mixture of CH$_3$SiO$_{3/2}$, carbon and Si$_3$N$_4$ is baked at a temperature of 1300° to 1500° C. in an atmosphere mainly consisting of a nitrogen gas or a gas of a nitrogen compound. The main constitutent of said atmosphere includes N$_2$ gas, NH$_3$ gas, a mixture of N$_2$ and H$_2$ gases and a mixture of N$_2$ and any other inert gas. Particularly preferred for the production of high purity $\alpha$-Si$_3$N$_4$ is an atmosphere which contains N$_2$ or NH$_3$ acting as a main reaction gas.

Where baking is carried out at a lower temperature than 1300° C., then it is difficult to produce the desired powder of Si$_3$N$_4$. Where baking is carried out at a higher temperature than 1500° C., then SiC is unnecessarily grown. In either case, it is impossible to produce powder of the desired $\alpha$-Si$_3$N$_4$ which is adapted to be used as a material of a structural member resistant to high temperature and great stress. If the formation of SiC is permissible, baking may be carried out at a higher temperature than 1500° C.

After the above-mentioned baking is carried out at a temperature of 1300° to 1500° C., the final product of $\alpha$-Si$_3$N$_4$ may be further heat-treated at a temperature of 600° to 800° C. in an oxidizing atmosphere to remove the residual carbon.

Where a mixture of a liquid silane derivative, carbon and powder of a nucleating agent is hydrolyzed to produce a precipitate, then said precipitate is supposedly deposited on the surface of particles of carbon powder. A solid component containing the product of hydrolysis is separated by washing. The separated solid component should preferably be heat-treated for dehydration at a temperature of 200° to 300° C. The product of hydrolysis, for example, CH$_3$SiO$_{3/2}$ is adsorbed to the surface of particles of carbon powder over a broad contact area, thereby effecting the smooth reduction of SiO$_2$ by carbon. Since, further, the alkyl group is readily substituted by nitrogen, the aforesaid nitrogenization reaction quickly proceeds.

As described above, the method of this invention can manufacture from inexpensive raw materials powder of $\alpha$-Si$_3$N$_4$ of high purity and substantially uniform particle size which has sufficiently excellent properties to be applied as a material of a sintered structural member resistant to high temperature and great stress. Powder of $\alpha$-Si$_3$N$_4$ produced by the method of the invention contains as small an amount of impurities as less than one-tenth of those contained in the prior art similar product in which SiO$_2$ is used as a starting material.

This invention will be more fully understood from the examples and controls which follow.

EXAMPLE 1

1 part by weight (as converted to SiO$_2$) of methyltrichlorosilane, 0.4 part by weight of powder of carbon having a means particle size of 0.029 micron and 0.01 part by weight of powder of Si$_3$N$_4$ having a mean particle size of 0.3 micron were blended together to provide a liquid-solid mixture. A large amount of pure water was added to the mixture. The mass was hydrolyzed with heat generation well controlled to produce a precipitate. A solid component containing the precipitate was washed with water to thoroughly remove HCl, followed by drying at 110° C. for 3 hours. The dried solid component was roughly crushed in a ball mill. The crushed mass was left 5 hours in streams of N$_2$ gas at 1450° C. for reaction. The reacted means was heat-treated 3 hours in the air at 700° C. to remove the residual carbon, producing powder of Si$_3$N$_4$.

The produced powder of Si$_3$N$_4$ had a high purity. Metal impurities totaled less than 0.05%. The produced powder of Si$_3$N$_4$ had a mean particle size of 1.2 microns and contained 98% of $\alpha$-Si$_3$N$_4$.

EXAMPLES 2 TO 13 AND CONTROL 1 TO 3

Powder of $\alpha$-Si$_3$N$_4$ was produced in substantially the same manner as in Example 1, except that the proportions of raw materials and the conditions of reaction were changed, the results of determining the properties of the sample products being set forth in Table 1 below.

TABLE 1

| Samples | Proportions of raw materials | | | Reaction conditions | | | Properties of produced powder | | | |
|---|---|---|---|---|---|---|---|---|---|---|
| | SiO$_2$* | C | Si$_3$N$_4$ | temperature | Time (hr) | Material of reaction atmosphere | Particle size (microns) | Percentage nitrogen content (%) | Percentage content of $\alpha$-Si$_3$N$_4$ (%) | Percentage content of impurities (%) |
| 1 | 1 | 0.4 | 0.01 | 1450 | 5 | N$_2$ | 1.2 | 37.4 | 98 | 0.05 |
| 2 | 1 | " | 0.02 | " | " | " | 1.1 | " | 96 | " |
| 3 | 1 | " | 0.05 | " | " | " | " | 37.5 | 95 | 0.06 |
| 4 | 1 | " | 0.1 | " | " | " | 1.0 | 37.8 | " | 0.05 |
| 5 | 1 | 0.3 | 0.02 | " | " | " | 1.5 | 36.8 | " | " |

TABLE 1-continued

| Sam-ples | | Proportions of raw materials | | | Reaction conditions | | | Properties of produced powder | | | |
|---|---|---|---|---|---|---|---|---|---|---|---|
| | | SiO₂* | C | Si₃N₄ | tempera-ture | Time (hr) | Material of reaction atmosphere | Particle size (microns) | Percentage nitrogen content (%) | Percentage content of α-Si₃N₄ (%) | Percentage content of impurities (%) |
| Examples | 6 | 1 | 0.6 | 0.01 | " | " | " | 0.9 | 37.5 | 98 | 0.04 |
| | 7 | 1 | 1 | " | " | " | " | 0.8 | 37.8 | 98 | 0.06 |
| | 8 | 1 | 2 | " | " | " | " | " | 37.5 | 97 | 0.03 |
| | 9 | 1 | " | 0.1 | " | " | " | 0.5 | 37.8 | 95 | " |
| | 10 | 1 | 4 | " | " | " | " | " | 37.2 | " | 0.04 |
| | 11 | 1 | 1 | 0.01 | 1400 | " | " | 0.8 | 37.9 | 98 | 0.03 |
| | 12 | 1 | 0.4 | " | 1500 | 10 | " | 1.3 | 37.8 | 97 | 0.04 |
| | 13 | 1 | " | " | 1450 | 5 | N₂+H₂ | 1.2 | 37.4 | 98 | 0.03 |
| Controls | 1 | 1 | 4 | 0.1 | " | " | N₂ | 1.1 | 37.5 | 96 | 0.13 |
| | 2 | 1 | 0.4 | 0.01 | " | " | " | 2.0 | 32.1 | 95 | 0.09 |
| | 3 | 1 | " | 0 | " | " | " | 4.5 | 37.0 | 92 | 0.05 |

*Proportions of methyltrichlorosilane used as a starting material as converted to SiO₂ obtained after hydrolysis and baking As apparent from Table 1 above, the samples of powder of Si₃N₄ produced by the method of this invention all contain a smaller amount of impurities than 0.09%, as large an amount of α-Si₃N₄ as over 95%, as high a content of nitrogen as 36 to 38%, and as small a particle size as less than 1.5 micron. Therefore, powder of Si₃N₄ produced by the method of this invention has been proved suitable to be used as a material of a structural member resistant to high temperature and great stress.

What we claim is:

1. A method for producing powder of α-silicon nitride which comprises the steps of:

adding 0.3 to 2 parts by weight of powder of carbon and 0.005 to 1 part by weight of at least one silicon compound selected from the group consisting of Si₃N₄, SiC and Si₂ON₂ to one part by weight, when converted to SiO₂ of a liquid alkylchlorosilane that forms a precipitate and HCl by hydrolysis which precipitate is convertible to SiO₂ at a baking temperature of 1300° to 1500° C.;

hydrolyzing the resultant mixture;

washing the mixture to separate a solid component; and baking the solid component at a temperature of 1300° to 1500° C. in an atmosphere mainly consisting of a nitrogen gas or a gas of a nitrogen compound to effect formation of α-silicon nitride.

2. A method for producing powder of α-silicon nitride which comprises the steps of:

hydrolyzing a liquid alkylchlorosilane that forms a precipitate and HCl by hydrolysis, which precipitate is convertible to SiO₂ at a baking temperature of 1300° to 1500° C.;

washing the hydrolyzed mass to separate a solid component;

adding 0.3 to 2 parts by weight of powder of carbon and 0.005 to 1 part by weight of at least one silicon compound selected from the group consisting of Si₃N₄, SiC and Si₂ON₂ to 1 part by weight when converted to SiO₂ of said solid component; and baking the resultant mixture at a temperature of 1300° to 1500° C. in an atmosphere mainly consisting of a nitrogen gas or a gas of a nitrogen compound to effect formation of α-silicon nitride.

3. The method according to claim 1 or 2, wherein the alkylchlorosilane is methyltrichlorosilane.

4. The method according to claim 1 or 2, wherein the alkylchlorosilane is a mixture of methyltrichlorosilane and dimethyldichlorosilane.

5. The method according to claim 1 or 2, wherein the nitrogen compound gas is NH₃.

6. The method according to claim 1 or 2, wherein the solid component is thermally dehydrated at a temperature of 200° to 300° C., before heat-treated at a temperature of 1300° to 1500° C.

7. The method according to claim 1 or 2, wherein the reaction product heat-treated at a temperature of 1300° to 1500° C. is again heat-treated in an oxidizing atmosphere at a temperature of 600° to 800° C.

8. The method according to claim 1 or 2, wherein the powder of carbon is added in an amount ranging from 0.4 to 1 part by weight.

9. The method according to claim 1 or 2, wherein the powder of the silicon compound is added in an amount ranging from 0.01 to 0.1 part by weight.

10. The method according to claim 1 or 2, wherein the powder of carbon has a mean particle size smaller than 1 micron.

11. The method according to claim 1 or 2, wherein the powder of the silicon compound has a mean particle size smaller than 2 microns.

* * * * *